United States Patent [19]

Walsh, Jr.

[11] Patent Number: 4,595,033
[45] Date of Patent: Jun. 17, 1986

[54] LOW PRESSURE HIGH TEMPERATURE SAFETY VALVE

[75] Inventor: Richard D. Walsh, Jr., Pineville, La.

[73] Assignee: Dresser Industries, Inc., Dallas, Tex.

[21] Appl. No.: 716,511

[22] Filed: Mar. 25, 1985

Related U.S. Application Data

[63] Continuation of Ser. No. 537,881, Sep. 30, 1983, abandoned.

[51] Int. Cl.[4] .............................................. F16K 17/12
[52] U.S. Cl. ..................................... 137/529; 137/534
[58] Field of Search ................. 137/529, 534; 220/206

[56] References Cited

U.S. PATENT DOCUMENTS

| 129,991 | 7/1872 | Smart | 137/529 |
|---|---|---|---|
| 267,796 | 11/1892 | McKee | 137/534 |
| 777,632 | 12/1904 | Henry | 137/534 X |
| 1,268,597 | 6/1918 | Montreuil | 137/529 |
| 1,631,263 | 6/1927 | Greenhouse | 137/529 X |
| 1,743,350 | 1/1930 | Hopkins | 137/534 X |
| 2,628,632 | 2/1953 | Dayton | 137/469 |

FOREIGN PATENT DOCUMENTS

| 634501 | 2/1928 | France | 137/534 |
|---|---|---|---|
| 444907 | 10/1974 | U.S.S.R. | 137/534 |

Primary Examiner—Robert G. Nilson
Attorney, Agent, or Firm—Daniel Rubin

[57] ABSTRACT

A safety valve for relief of overpressure from a relatively low pressure high temperature fluid system with which the valve is intended to be operative. System pressure is communicated via a body inlet leading to the underside of a displaceable closure disc that cooperates with an annular seat for opening and closing the valve to fluid flow. A predetermined loading force is applied against the topside of the disc urging it toward closed position in opposition to fluid pressure thereat. To minimize or eliminate adverse temperature effects on the disc loading force at the set point operation of the valve, the closure force imposed against the disc is divided between a coaxially supported mass of predetermined weight and a compressed coil spring operative in series relation therewith.

3 Claims, 1 Drawing Figure

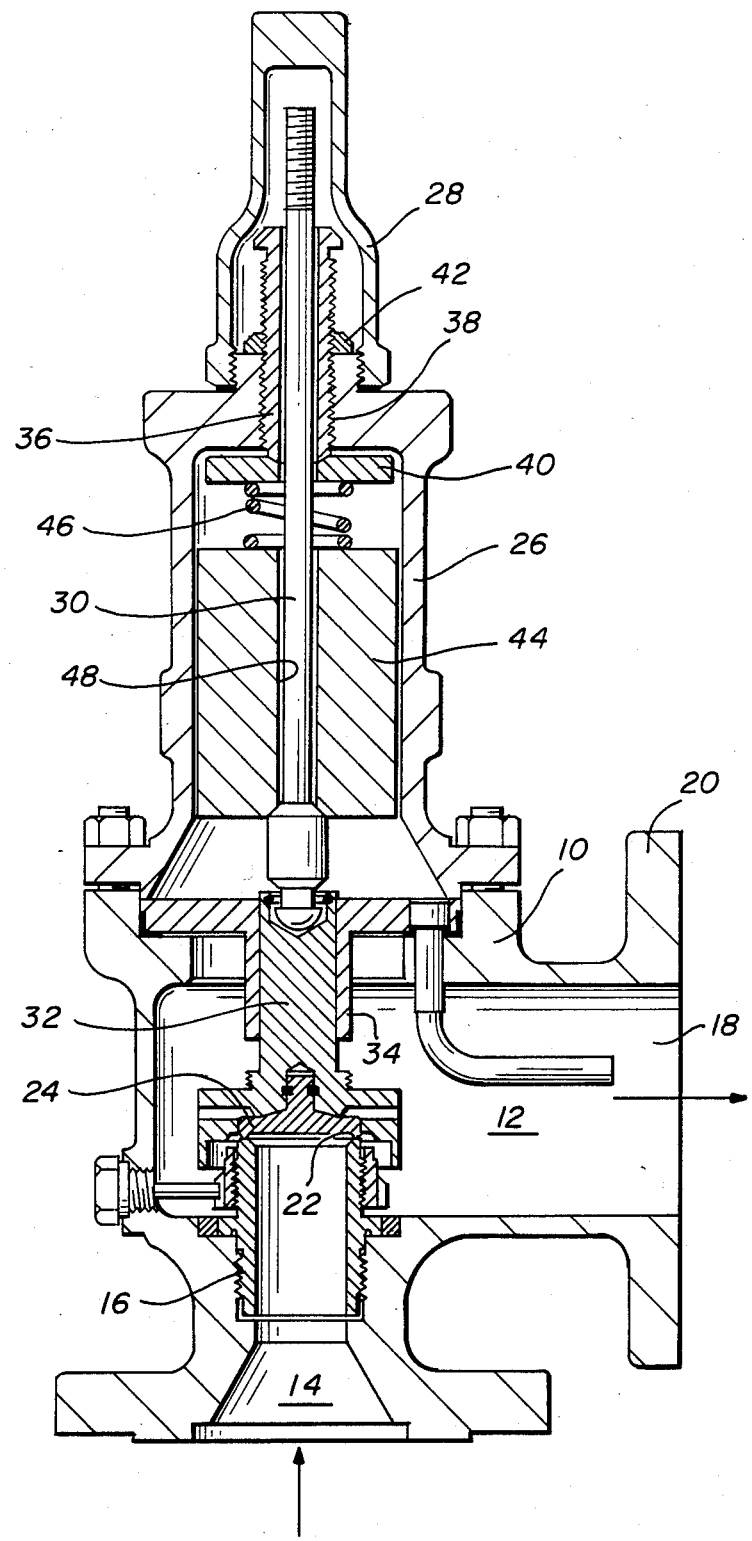

LOW PRESSURE HIGH TEMPERATURE SAFETY VALVE

This application is a continuation of application Ser. No. 537,881, filed Sept. 30, 1983, now abandoned.

Technical Field

The technical field to which the invention relates comprises the art of fluid handling.

BACKGROUND OF THE INVENTION

Standard safety valves for industrial applications are commonly constructed in a manner disclosed generally, for example, in U.S. Pat. No. 2,628,632. In such arrangements, the valve typically includes a flow passage extending from an inlet to an outlet on an axis offset with respect to the inlet. At an intermediate location of the passage, a closure disc cooperates with an annular seat to open and close the valve to fluid flow. Urging the disc toward a closed position by imposing a predetermined loading force against the topside of the disc is usually achieved by means of a compressed coil spring acting in opposition to the fluid force of the system being monitored that tends to urge the disc on its underside toward the open position. The magnitude of force imposed by the compressed spring is generally preadjusted to a customer's specification for the set point at which a value of fluid pressure to be relieved can initiate movement of the disc toward the open valve position.

Valves of the foregoing type are typically utilized for relief of fluid pressures on the order of 50 to 2000 psig and at temperatures usually less than about 1000° F. Under such conditions, set point operation of the valve is reliably predictable pursuant to the government codes regulating performance of these valves. However, under operating conditions of relatively low pressure, on the order of less than about 50 psig, and high fluid temperature, on the order of 1000° F. and above, thermal conductivity from the fluid median within the valve body tends to introduce physical property changes in the coil spring which in turn alters the spring load previously set. These load changes that are attributed to spring force variations caused by thermal expansion and modulus of elasticity changes of the spring materials as a function of temperature, have been found to cause operational instability of the valve by adversely affecting the intended set point previously established.

Prior but unsuccessful attempts to resolve the foregoing have largely centered around modified spring designs or inverted mountings to remove intrinsic component weight effects. However, despite recognition of the problem, a more satisfactory solution therefor has not heretofore been known.

SUMMARY OF THE INVENTION

This invention relates to industrial type safety valves for relief of overpressure from a fluid system and more specifically to such valves operative under fluid relief conditions of low pressure and high temperature at which previous constructions have generally operated unsatisfactorily. This is achieved in accordance with the invention by modifying an otherwise generally standard valve to impose the closure force against the disc via a coaxially supported mass of predetermined weight series-loaded in combination with an adjustably settable coil spring to calibrate the final setting for set point operation. With the mass weight sized to provide approximately ninety percent or more of the total load force, the spring assumes only a minor portion of the load, and being positioned physically above the weight furthest removed from the valve body the spring incurs only minimal, if any, adverse effects from thermal conductivity of the valve. This results in set point operation of the valve being maintained without the thermally induced instability incurred by the prior constructions under these same operating conditions.

It is therefore an object of the invention to provide a safety valve construction affording reliably predictable set point operation for fluid monitoring conditions of relatively low pressure and relatively high temperature.

It is a further object of the invention to effect the foregoing object in a highly novel and economical manner.

BRIEF DESCRIPTION OF THE DRAWING

FIG. 1 is a sectional elevation through a safety valve incorporating the invention hereof.

Referring now to the drawing, there is basically disclosed a safety valve of a type commercially available as a Consolidated ® type 1900 series safety valve. Briefly, the valve is comprised of a body or base 10 defining a flow passage 12 extending from an inlet 14 through nozzle 16 to an outlet 18 surrounded by flange 20. At the downstream end face of nozzle 16 there is provided an annular seat 22 with which a displaceable closure disc 24 is adapted to cooperate for opening and closing fluid flow through passage 12 from inlet 14 to outlet 18.

Bolted to the top portion of the body is an internally open bonnet 26 which with a hollow cap 28 encloses a slideable spindle 30. The spindle is secured at its lower end in a disc holder 32 adapted for upward displacement within tubular guide 34 and on which disc 24 is mounted. For imposing the set point loading of the valve there would normally be provided a compressed coil spring (not shown) adjustable by means of an adjustment screw 36. The adjustment screw is threadedly displaceable in bonnet threads 38 for vertical positioning of spring washer 40. A screw nut 42 is utilized to secure the position of screw 36 after all adjustments have been completed.

For effecting set point loading for low pressure high temperature conditions in accordance with the invention, the conventional coil spring supra has been eliminated, and instead is imposed by a combination of a cylindrical mass 44 in combination with a relatively small spring 46 operable in a manner as will be explained. To accommodate mass weight 44 in this arrangement, the weight includes a central axial bore 48 through which to loosely receive spindle 30 and is of outside diameter sufficiently smaller than the internal diameter of bonnet 26 thereat as to enable upward displacement of the weight free of sidewall interference.

To effect loading for purposes hereof, mass 44 is intended to provide at least eighty-five percent and preferably at least ninety to ninety-five percent of the set point load force so as to minimize the remaining load assumed by spring 46, it being the purpose of the spring to enable fine tune adjustment of set point via adjustment screw 36. Mass 44 for these purposes should preferably be of a high density, high mass per unit volume composition and typically is a metal alloy. A preferred alloy is a stainless steel to also minimize and avoid potential corrosion that could otherwise occur. With the loading participation contributed by spring 46 being limited to on the order of less than ten percent, and being located above mass 44 furthest removed from body 10, any thermal effects imposed on mass 44 will have minimal, if any, effect on spring 46, and an inconsequential, if any, effect on the set point operation of the valve.

By the above description there is disclosed a novel construction which readily adapts an otherwise standard safety valve for reliably predictable operation when monitoring high temperature fluid at relatively low pressure set points. Since variations in thermal effects imposed on mass 44 do not per se affect the loading, and any thermal effect thereof transmitted to spring 46 would be miniscule if at all, operation under those conditions can be reliably and predictably obtained by a modest structural substitution at minimal, if any, increase in cost. The arrangement provides maximum benefit for extremely high temperature relief devices due to superior thermal stability of the resisting force, while at the same time is more finely adjustable than conventional designs in providing a constant resisting force regardless of lift position. Consequently, a solution to a long standing problem is resolved in accordance with the invention in a highly satisfactory manner as compared to previous approaches pursued therefor.

Since many changes could be made in the above construction and many apparently widely different embodiments of this invention could be made without departing from the scope thereof, it is intended that all matter contained in the drawing and specification shall be interpreted as illustrative and not in a limiting sense.

The embodiments of the invention in which an exclusive property or privilege is claimed are defined as follows:

1. In a safety valve for relieving overpressure of a fluid at temperatures of about at least 1000° F. including a body defining a fluid passage extending between an inlet and an outlet, an annular seat surrounding said passage at an intermediate location thereof and a disc displaceably movable from between an urged first position engaging said seat to prevent fluid flow therepast toward a second position removed from said seat to permit fluid flow to the outlet in response to a fluid overpressure, the improvement for imposing the set point load force against said disc and comprising:
    (a) an elongated spindle operably connected to said disc for displacement therewith;
    (b) a mass of predetermined weight capable of imposing at least eight-five percent of the force sought to be imposed against said disc for urging said disc toward said closed position, said mass being of a stainless steel composition characterized by a relatively high mass per unit volume affording a relatively high order of thermal stability with a thermal conductivity substantially in the range of 6.85–21.4 $Btu/h/ft^2/°F./ft$ and including a central bore through which to receive said spindle;
    (c) support means to support said mass at a location physically displaced from said disc but in force-imposing relation thereagainst, said support means comprising means providing an engagement interference in a weighted direction between said mass and said spindle;
    (d) a coil spring operably positioned in a series load relation with said mass for imposing the remaining load force sought to be imposed against said disc, said spring being positioned for relative temperature stability at a mass surface located furthest removed from the fluid passage in said body in relative thermal isolation from the temperature of said fluid passage as compared to said disc; and
    (e) adjustment means to adjust the load imposed by said spring to calibrate the combined loading for the intended set point setting of said valve.

2. In a safety valve according to claim 1 in which said coil spring is mounted about said spindle positioned intervening between said mass and said adjustment means.

3. In a safety valve according to claim 2 in which said spring is adapted to impose a remaining load force of less than about ten percent of the load force sought to be imposed against said disc.

* * * * *